(12) United States Patent
Muppirala et al.

(10) Patent No.: US 7,831,857 B2
(45) Date of Patent: Nov. 9, 2010

(54) METHOD AND SYSTEM FOR RECOVERING FROM OPERATING SYSTEM CRASH OR FAILURE

(75) Inventors: Kishore Kumar Muppirala, Bangalore (IN); Bhanu Gollapudi Venkata Prakash, Bangalore (IN); Vishwas Venkatesh Pai, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 358 days.

(21) Appl. No.: 11/872,968

(22) Filed: Oct. 16, 2007

(65) Prior Publication Data

US 2008/0133968 A1     Jun. 5, 2008

(30) Foreign Application Priority Data

Oct. 31, 2006     (IN) .................. 2001/CHE/2006

(51) Int. Cl.
*G06F 11/00*     (2006.01)

(52) U.S. Cl. .............................................. 714/5; 714/2
(58) Field of Classification Search ..................... 714/2, 714/5–10, 11, 12, 13; 711/1, 162
See application file for complete search history.

(56) References Cited

U.S. PATENT DOCUMENTS

| 5,291,600 | A  | * | 3/1994  | Lutz et al. ............... 714/15 |
| 6,167,494 | A  | * | 12/2000 | Cheston et al. ........... 711/162 |
| 6,552,672 | B1 |   | 4/2003  | Ghildiyal |
| 7,389,442 | B1 | * | 6/2008  | Lee ........................ 714/2 |
| 7,437,524 | B2 |   | 10/2008 | Narayan |
| 2008/0195836 | A1 | | 8/2008 | Muppirala |

* cited by examiner

*Primary Examiner*—Dieu-Minh Le

(57) ABSTRACT

A method of recovering from an operating system crash or failure in a first memory. Upon detecting the crash or failure, a second memory provided as auxiliary memory to the first memory and being of equal size to the first memory is initialized, the operating system is booted in the second memory, content of the first memory is dumped to a dump storage device, and the first memory is prepared for use as auxiliary memory.

21 Claims, 4 Drawing Sheets

METHOD AND SYSTEM FOR RECOVERING FROM OPERATING SYSTEM CRASH OR FAILURE

RELATED APPLICATIONS

The present application is based on, and claims priority from, Indian Application Number 2001/CHE/2006, filed Oct. 31, 2006, the disclosure of which is hereby incorporated by reference herein in its entirety.

BACKGROUND OF THE INVENTION

Operating System (OS) failure can occur owing to either hardware failure or software failure. When the system fails, it is important to collect the memory dump for diagnosis or problem analysis. This process of collecting the failed system memory into a secondary store is called "dumping". Typically, existing dumping techniques save the memory dump to a physical secondary storage device (termed the "dump device") before the system reboots.

Background art techniques of dumping involve copying either all or selected portions of the system memory into a physical device. This is usually performed by a single threaded application and typically under limited resources and limited support from the OS. With increasing system memory configurations, the traditional method of performing memory dump require (and will continue to require) more time to complete. Several solutions exist to reduce dump time, to increase system availability.

Parallel Dump After an OS crash, this technique utilizes all the CPUs in the system to improve the dumping speed. Since the dump driver code executes with minimal OS support (being a firmware driver), dumping cannot be made parallel as synchronization between the dumping threads becomes complicated. This technique is faster than with a single threaded dump driver, but incurs considerable computing overhead in dumping the physical memory to the dump device. The benefit actually realizable with this technique is limited by the throughput capability of the firmware driver, which is usually single threaded.

Dump to Memory (D2M): This approach is employed to copy the memory to be dumped to another part of the physical memory instead of to a secondary memory device. It is fast, as only a memory to memory copy is involved. However, the next instance of the OS must boot with less memory (at least until the D2M memory is returned to the OS after a dump analysis or after saving the D2M memory to disk), which can affect overall system performance. Further, D2M incurs a "dump time", viz. the time spent moving all relevant dump-worthy memory pages to a contiguous physical memory region, and is not able to handle a complete memory dump, as no room remains to load the next kernel.

Dump While ReBooting (DWRB): The DWRB technique addresses the deficiencies of dump driver performance and improves the system availability by saving a minimal amount of memory (termed "golden memory") before starting the re-boot process. However, some time is still required to save the golden memory, even if the best post-panic dump technique (such as a concurrent dump) is employed.

In all the techniques discussed above, certain amounts of time are required to dump the memory to either a secondary store or to another part of memory, before the system can reboot.

BRIEF DESCRIPTION OF THE DRAWING

In order that the invention may be more clearly ascertained, embodiments will now be described, by way of example, with reference to the accompanying drawing, in which.

DETAILED DESCRIPTION OF THE EMBODIMENTS

There will be described a method for recovering from an operating system crash or failure in a first memory.

In one described embodiment, the method comprises upon detecting the crash or failure, initializing a second memory provided as auxiliary memory to the first memory and being of equal size to the first memory, booting the operating system in the second memory, dumping content of the first memory to a dump storage device, and preparing the first memory for use as auxiliary memory.

Dumping the content of the first memory to the dump storage device may comprise online adding the first memory to the second memory, dumping the content to the dump storage device, and signalling to either the operating system or to firmware accessible by the operating system that the dumping has been completed.

There will also be described a system or device adapted to recover from an operating system crash or failure in a first memory.

Figure 1:
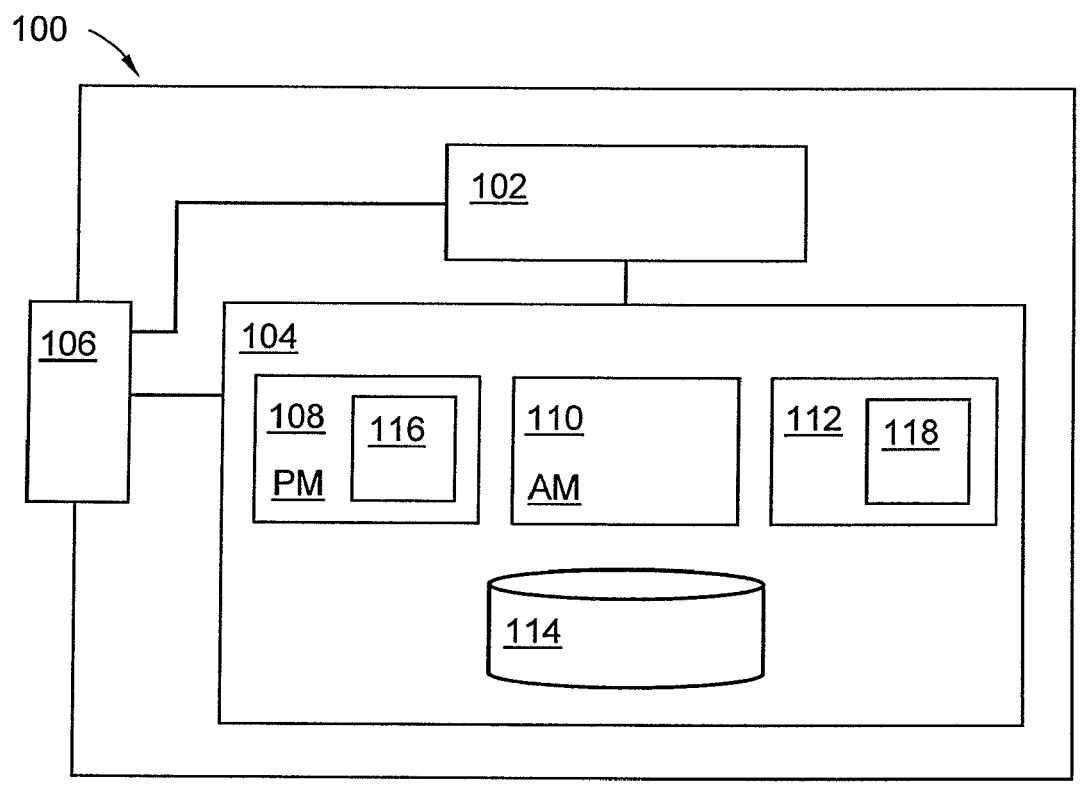
FIG. 1 is a schematic view of a computing system adapted to recover from operating system crash or failure according to an embodiment of the present invention, shown after the creation of a new instance of the operating system following a crash.

A computing system adapted to recover from an operating system crash or failure according to an embodiment of the present invention is shown schematically at 100 in FIG. 1. System 100 includes a processor 102, a memory 104, and an I/O device 106. The memory 104 includes a first memory 108, a second memory 110 of equal size to first memory 108, read-only-memory (ROM) 112 and a hard-disk drive 114. First memory 108 and second memory 110 both comprise RAM; first memory 108 is initially the primary memory (PM). Second memory is of equal size to first memory 108, but is initially an auxiliary memory (AM). First memory 108 includes an operating system (OS) 116, which is executable by processor 102 including to control system 100 to perform the functions described below (unless otherwise attributed). ROM 112 includes firmware 118, which is also executable by processor 102 to control system 100 to perform the particular functions described below as performed "by the firmware".

Hard-disk drive 114 has a copy of the operating system (for loading into RAM upon boot-up), and in addition acts as a secondary storage dump device. It will be understood, however, that system 100 can optionally include a separate dump device, which may be in the form of another hard-disk drive (such as an external hard-disk drive). In the following description, however, reference is made to dump device 114.

The view shown in FIG. 1 depicts the system 100 immediately after system boot-up, during which firmware 118 loads OS 116 into first (at this point, primary) memory 108. Immediately after that has occurred, OS 116 is not aware of second (or auxiliary) memory 110; only firmware 118 is aware of second memory 110.

Figure 2:
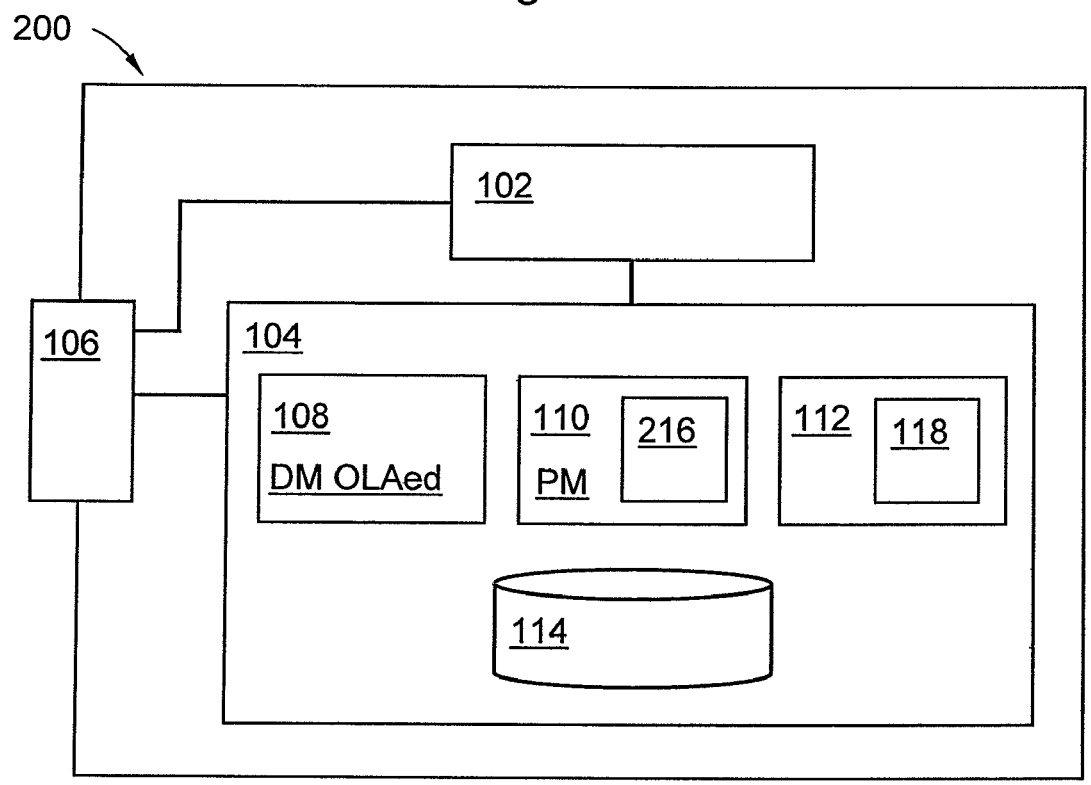
FIG. 2 is a schematic view of the computing system of FIG. 1, shown immediately after boot-up.

When OS 116 encounters a critical failure or crash in first memory 108, OS 116 communicates a system crash event to firmware 118; in response, firmware 118 reboots the system immediately without performing a memory dump and does not, as a part of the boot-up cycle, power cycle (or reset) first memory 108 (in which the crash occurred). After the crash event, first memory 108 is termed "Dirty Memory" (DM). Firmware 118 performs a failover to second memory 110 to be used as primary memory for rebooting the OS after the crash. That is, firmware 118 physically switches to using second memory 110 (i.e. the former auxiliary memory of the previously booted OS 116) as the primary memory for the current OS boot-up 216. FIG. 2 is a schematic view of system 100 after the crash, with the new instance 216 of the OS now in second memory 110.

After the OS 216 boots-up in second memory 110, OS 216 queries firmware 118 and detects that this is not a normal boot-up, but rather a reboot following a crash event. A memory dumping application (which is a part of the current OS instance as a kernel process) recognizes that there is a crash event and starts dumping the Dirty Memory (viz. first memory 108) to dump device 114. The dumping application also initiates an OnLine Addition (OLA) of the Dirty Memory into the current OS instance 216.

Figure 3:
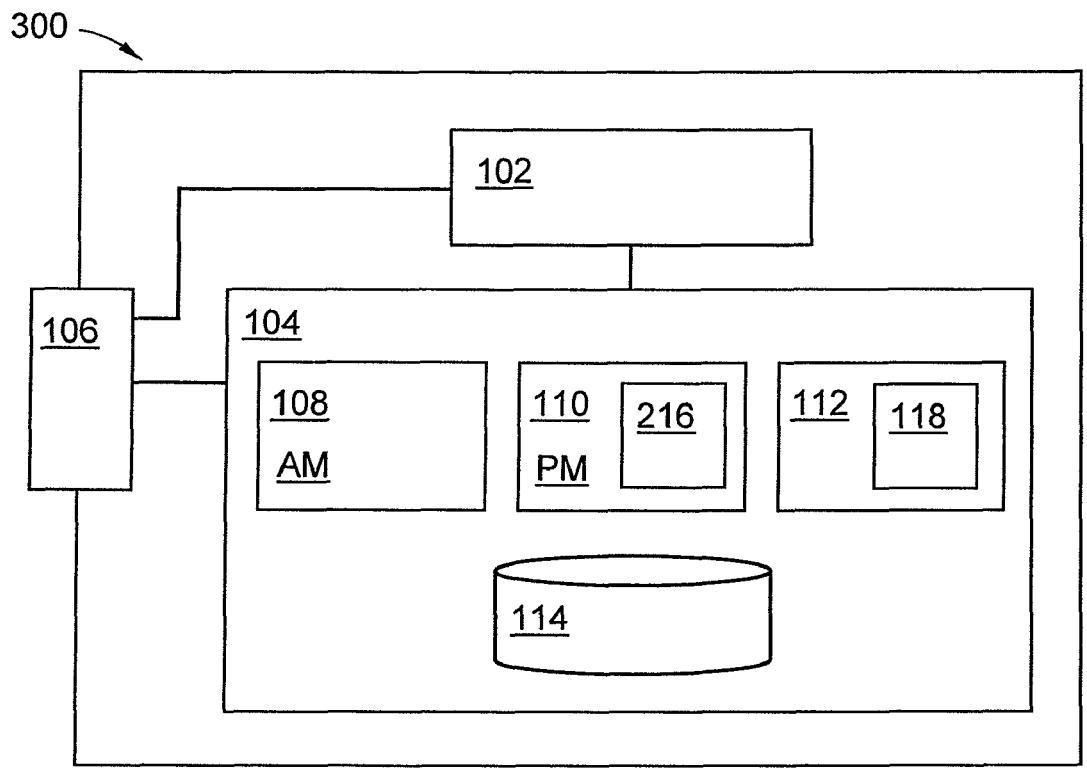
FIG. 3 is a schematic view of the computing system of FIG. 1, shown after full recovery from the crash.

Though the memory available to OS 216 has been doubled by the OLA operation of the Dirty Memory, this memory is not given to the memory allocator of OS 216 so neither the user applications nor the current OS 216 can allocate any of the newly added memory (viz. the Dirty Memory) for read-write purposes; it is instead treated for the present as read-only memory. The data in the Dirty Memory is dumped to dump device 114 by the memory dumping application process as a background process while the current OS 216 is functioning normally using second memory 110 as primary memory. This can be done with a single kernel thread, but in this embodiment multiple kernel threads are used for dumping the Dirty Memory, so the background dumping application process can complete more quickly. Once the dump is written to dump device 114, the Dirty Memory is OnLine Deleted (OLDed) by the memory dumping application and a "dump complete" signal is posted to firmware 118. On receiving this event, firmware 118 clears the OS "crash event" and marks the Dirty Memory (i.e. first memory 108) as auxiliary memory. FIG. 3 is a schematic view 300 of the system 100 at this stage.

Thus, system 100 employs auxiliary memory and switches the system memory with firmware 118. The roles of primary and secondary memory are again switched in the same manner should another crash occur. This embodiment allows a total system dump with reduced overhead, as the memory dump is performed entirely after the next instance of the OS has booted-up.

Figure 4A:
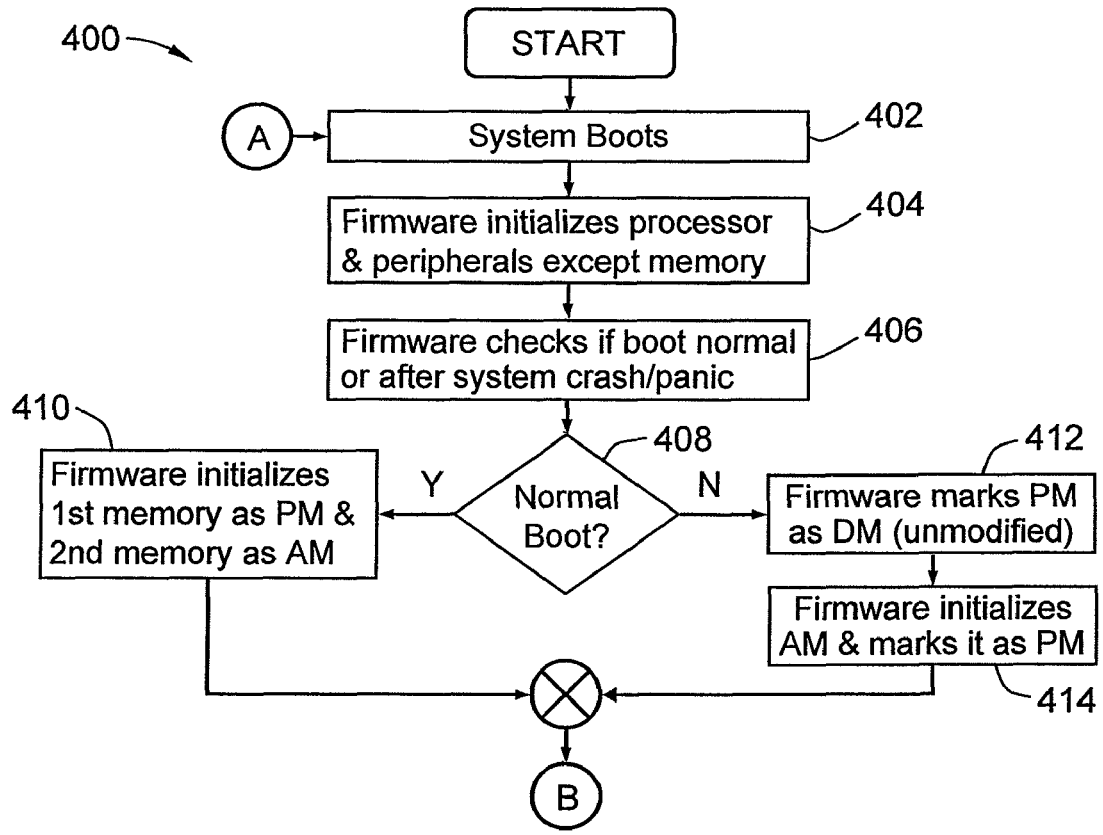
FIGS. 4A, 4B and 4C constitute a flow diagram of a method of recovering from operating system crash or failure according to an embodiment of the present invention.
Figure 4B:
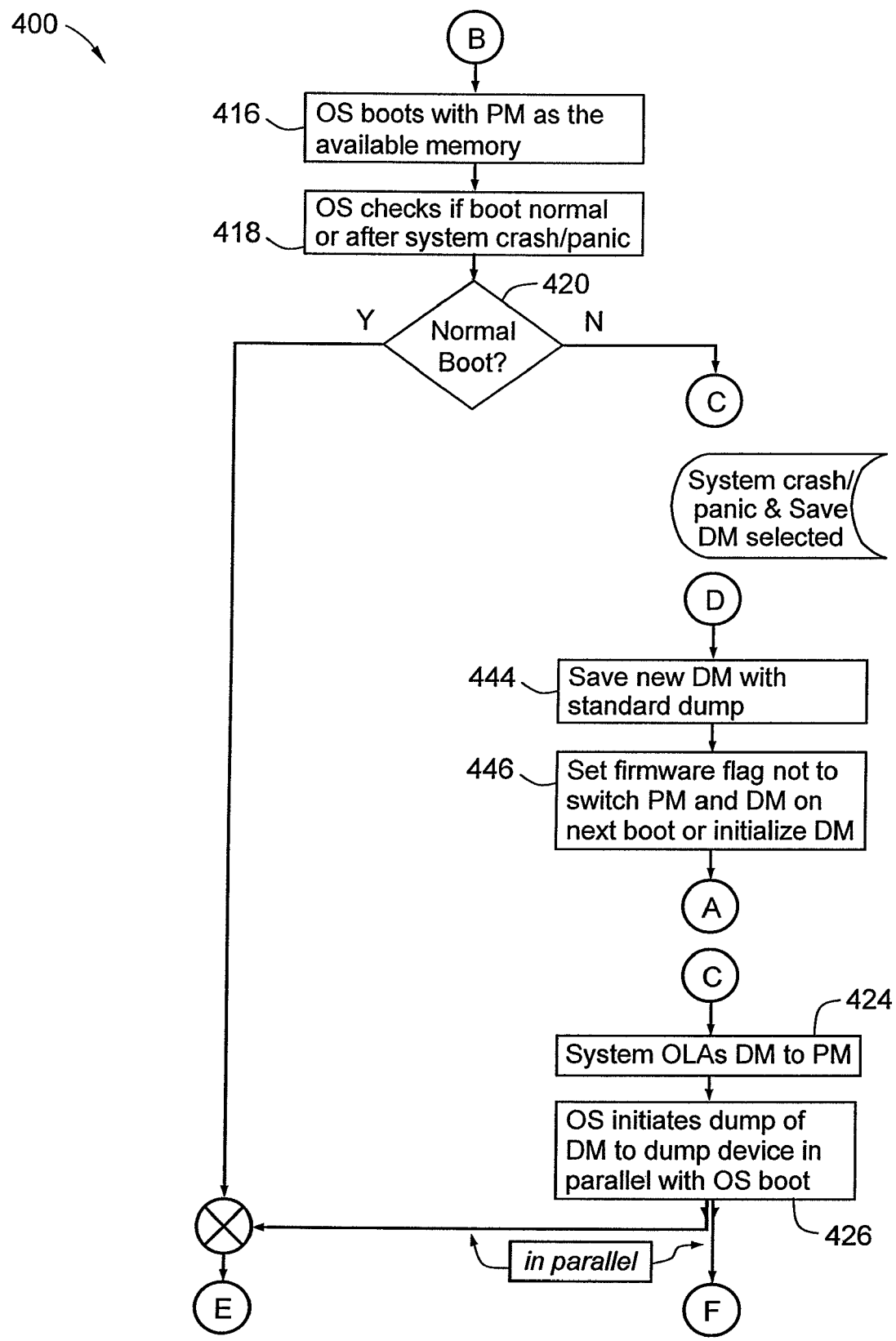
Figure 4C:
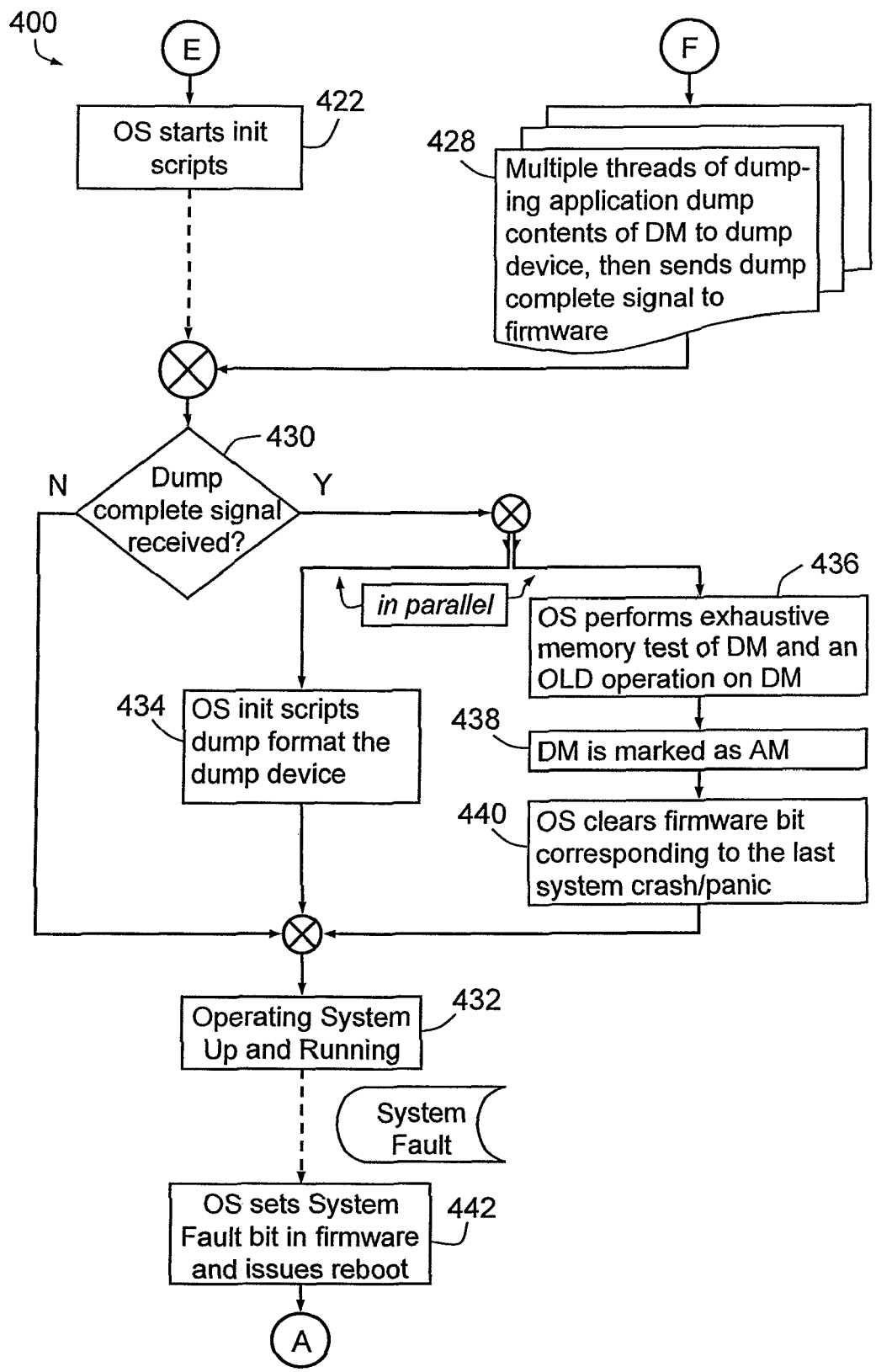

FIGS. 4A, 4B and 4C are a flow diagram of a method 400 (employed by system 100) according to this embodiment for recovering from an operating system crash or failure. At step 402 the system boots, starting the system bring up.

At step 404 firmware 118 initializes the processor 102 and other peripherals except the memory, as the way the memory is treated depends on whether this is a normal boot or a boot after a crash. Hence, at step 406 firmware 118 checks whether this is a normal boot or a boot after system crash or panic.

At step 408, if it was determined that this is a normal boot, processing is directed to continue at step 410 where the firmware initializes the first memory (or what can be deemed "first memory", since the two memories are essentially indistinguishable) as primary memory and the second memory as auxiliary memory. Processing this continues at step 416.

If, however, at step 406 the firmware determines that this is a boot after system crash or panic, at step 408 processing is directed to continue at step 412. At step 412, since a crash has just occurred, firmware 118 marks the current primary memory (without modifying its contents) as Dirty Memory, and—at step 414—initializes the auxiliary memory and marks it as the primary memory. Processing this continues at step 416.

At step 416, the OS boots with primary memory as the available or system memory. At step 418 the OS checks whether this is a normal boot or a boot after a system crash/panic. If a normal boot, at step 420 processing is directed to continue at step 422 where the OS starts initialization scripts. Processing then continues at step 430. If not a normal boot, at step 420 processing is directed to continue at step 424 where the system Online Adds (OLAs) the Dirty Memory (formerly the auxiliary memory) to the system memory (viz. the primary memory). At step 426, the OS initiates a dump of this memory to the dump device 114 (see step 428) and—in parallel—continues processing at step 422 where, as described above, the OS starts initialization scripts. Meanwhile, at step 428 multiple threads of the memory dumping application dump the contents of the Dirty Memory to secondary storage dump device 114. After the dump is completed the dumping application signals completion to the firmware.

At step 430 the OS checks whether a "dump complete" signal has been received. If not (corresponding to a normal boot up), processing continues at step 432 where the OS is up and running normally. If at step 430 it is determined that a "dump complete" signal has been received (corresponding to boot-up after crash), processing continues in parallel at both steps 434 and 436. Step 434 (which is optional) involves the OS initialization scripts performing a dump formatting action on the secondary storage dump device 114. Meanwhile, at step 436, the OS performs an exhaustive memory test of the Dirty Memory and an OnLine Delete (OLD) operation on the Dirty Memory; at step 438 the Dirty Memory is marked as auxiliary memory; and at step 440 the OS clears the firmware bit corresponding to the last system crash/panic. Processing then continues at step 432 where the OS is up and running normally.

If, at any future time, a System Fault occurs, at step 442 the OS sets System Fault bit in firmware 118 and issues a reboot. Processing then returns to the beginning of method 400, at step 402.

It will be appreciated that—if the OS 216 fails again before the dumping of the Dirty Memory is completed—according to the above-described procedure the Dirty Memory will be switched to be the primary memory for the next boot-up and the memory copy of the crash of the first OS 116 may be lost. This is also a feature of existing approaches should dumping code cause an OS crash. To address this potential problem, system 100 is configured to allow the user or system administrator to select whether, in such circumstances, the Dirty Memory should be saved or not. This choice will typically depend on the re-boot time requirements of the user or system administrator; he or she can either choose the slower path and save both dead system images, or—if it is desired that re-boot speed be maximized—choose to allow the older to be lost. Thus, if a further crash occurs at any time from when the system OLAs the Dirty Memory (formerly the primary memory) to the (new) primary memory (formerly the auxiliary memory) at step 424, to when the operating system is again up and running normally at step 432, and the OS/Firmware detects both that the "old" dead image has not yet been saved and that "Save Dirty Memory" has been selected to indicate that the new current system's dead memory (the "new" Dirty Memory) and the old Dirty Memory should both be saved even at the expense of re-boot speed, processing switches to step 444. At step 444, the new Dirty Memory is saved with a standard (background art) dumping mechanism. The DWRB technique (described above) could also be employed to speed-up this dumping mechanism (though, for simplicity, FIGS. 4A, 4B and 4C omit any detailed representation of that technique). Next, at step 446, a firmware flag is set to indicate to the firmware subsequently not to switch primary and Dirty Memory on next boot, and not to re-initialize Dirty Memory (as the OS will not have successfully saved when this firmware flag—if set—is checked). (This firmware flag, if set, produces a negative result when, at steps 418 and 420, the OS checks whether the boot is normal.) Processing them recommences at step 402.

Otherwise, if "Save Dirty Memory" has not been selected, the memories switch according to the procedure of this embodiment, resulting in the loss of the previous or old Dirty Memory.

This embodiment can work equally well in a "selective dump" scenario, where only selected pages of the OS image are stored to dump image. In the selective dump case, the process of selecting pages can be deferred for the memory dumping application process to perform the task of writing-out selected pages to the dump image on dump device 114.

If having the additional auxiliary memory is seen as expensive, a user of system 100 could be charged on a pay per use basis; the owner of system 100 would charge the user only for the duration for which the auxiliary/Dirty Memory is OLAed (and bound) to an OS instance. In a soft-partitioned system, like the HP vPars product, the auxiliary memories of different partitions could be provided as a single pooled auxiliary/Dirty Memory. This would reduce the cost for a customer, though foregoing the ability to use this approach simultaneously across all partitions (as a single auxiliary/Dirty Memory pool will not permit memory dumping in this manner by a second partition whose OS has crashed, while one partition's OS is recovering from its crash). Alternatively, in a partitioned system with multiple pooled auxiliary Memory, all but one of these pools could be used to satisfy the requirements of partitions that needed more memory capacity temporarily (according to this embodiment). For the duration of use of these memory pools, the system may not obtain the benefit of the approach of this embodiment if two operating system instances crash simultaneously, for the reason explained above.

Table 1 compares downtime of background art dump techniques with the method of this embodiment.

TABLE 1

|  | SYSTEM DOWNTIME | FIRMWARE DEPENDENCY |
| --- | --- | --- |
| Standard Dump | System reboot time + memory dump time | High |
| D2M | System reboot time + memory dump time | Medium |

TABLE 1-continued

|  | SYSTEM DOWNTIME | FIRMWARE DEPENDENCY |
| --- | --- | --- |
| DWRB | System reboot time + memory dump time | Low |
| Present Embodiment | System reboot time + nearly zero | Minimal |

In some embodiments the necessary software for controlling system 100 of FIG. 1 to perform the method 400 of FIGS. 4A, 4B and 4C is provided on a data storage medium. It will be understood that, in this embodiment, the particular type of data storage medium may be selected according to need or other requirements. For example, instead of a CD-ROM the data storage medium could be in the form of a magnetic medium, but any data storage medium will suffice.

The foregoing description of the exemplary embodiments is provided to enable any person skilled in the art to make or use the present invention. While the invention has been described with respect to particular illustrated embodiments, various modifications to these embodiments will readily be apparent to those skilled in the art, and the generic principles defined herein may be applied to other embodiments without departing from the spirit or scope of the invention. It is therefore desired that the present embodiments be considered in all respects as illustrative and not restrictive. Accordingly, the present invention is not intended to be limited to the embodiments described above but is to be accorded the widest scope consistent with the principles and novel features disclosed herein.

The invention claimed is:

1. A method of recovering from an operating system crash or failure in a first memory, comprising:
   upon detecting said crash or failure, initializing a second memory provided as auxiliary memory to said first memory and being of equal size to said first memory;
   booting said operating system in said second memory;
   dumping content of said first memory to a dump storage device; and
   preparing said first memory for use as auxiliary memory.

2. A method as claimed in claim 1, wherein said dumping of the content of said first memory to said dump storage device comprises:
   online adding said first memory to system memory including said second memory;
   dumping said content to said dump storage device; and
   signalling to either said operating system or to firmware accessible by said operating system that said dumping has been completed.

3. A method as claimed in claim 2, including dumping said content using multiple threads executing in parallel to said dump storage device.

4. A method as claimed in claim 1, including detecting said crash or failure with firmware.

5. A method as claimed in claim 1, including preserving said content of said first memory until dumped to said dump storage device.

6. A method as claimed in claim 1, wherein said preparing of said first memory for use as auxiliary memory comprises:
   dump formatting said dump storage device;
   memory testing said first memory;
   online deleting said first memory; and
   marking said first memory as auxiliary memory to said second memory.

7. A method as claimed in claim 1, further comprising:
detecting a further crash or failure, said further crash or failure occurring in said second memory;
in response to detecting said further crash or failure, initializing said first memory;
after initializing said first memory, booting said operating system in said first memory;
dumping, using said operating system booted in said first memory, content of said second memory to said dump storage device or to another dump storage device; and
after dumping said content of said second memory, preparing said second memory for use as auxiliary memory to said first memory.

8. A method as claimed in claim 1, further comprising:
detecting a further crash or failure, said further crash or failure occurring in said second memory before completion of said dumping of said content of said first memory to said dump storage device;
in response to detecting said further crash or failure, dumping content of said second memory to said dump storage device or to another dump storage device;
rebooting said operating system in said second memory; and
dumping or completing said dumping of said content of said first memory to said dump storage device.

9. A method as claimed in claim 1, further comprising providing said second memory at an additional cost on a pay per use basis while said content of said first memory is being saved.

10. The method of claim 1, wherein prior to said crash or failure, said first memory is used as primary memory, and wherein upon detecting said crash or failure, said second memory is marked as primary memory, wherein booting said operating system in said second memory is performed after detecting said crash or failure and after initializing said second memory and marking said second memory as primary memory, and
wherein dumping the content of said first memory to said dump storage device is performed by said operating system booted in said second memory.

11. The method of claim 10, further comprising:
after booting said operating system in said second memory, adding said first memory to system memory that includes said second memory, wherein adding said first memory to the system memory allows the operating system to perform the dumping of the content of said first memory to said dump storage device.

12. The method of claim 11, further comprising:
in response to receiving an indication that the dumping is complete, deleting said first memory from the system memory,
wherein preparing said first memory for use as auxiliary memory is performed after the deleting.

13. The method of claim 10, wherein preparing said first memory for use as auxiliary memory is performed after the dumping, wherein said first memory is prepared for use as auxiliary memory to said second memory.

14. A computing device or system adapted to recover from an operating system crash or failure, the device or system comprising:
a first memory;
a second memory of equal size to said first memory and initially designated as auxiliary memory to said first memory;
a processor;
machine instructions executable on said processor to control said device or system to respond to said crash or failure by:
initializing said second memory;
booting said operating system in said second memory;
dumping, by said operating system booted in said second memory, content of said first memory to a dump storage device; and
after the dumping, preparing said first memory for use as auxiliary memory to said second memory.

15. A device or system as claimed in claim 14, further comprising firmware configured to detect said system crash or failure, and to respond to said system crash or failure by initializing said second memory and identifying said second memory for rebooting said operating system in.

16. A device or system as claimed in claim 14, wherein said dumping of the content of said first memory to said dump storage device comprises:
online adding said first memory to a system memory including said second memory;
dumping said content to said dump storage device; and
signalling to either said operating system or to firmware accessible by said operating system that said dumping has been completed.

17. A device or system as claimed in claim 14, wherein said machine instructions are executable to control said device or system to:
detect another crash or failure in said second memory;
in response to detecting the another crash or failure, initialize said first memory;
after initializing said first memory, boot said operating system in said first memory;
dump, using said operating system booted in said first memory, content of said second memory to said dump storage device or to another dump storage device; and
after dumping said content of said second memory, prepare said second memory for use as auxiliary memory to said first memory.

18. A device or system as claimed in claim 14, wherein preparing said first memory for use as auxiliary memory comprises:
dump formatting said dump storage device;
memory testing said first memory;
online deleting said first memory; and
marking said first memory as auxiliary memory to said second memory.

19. A device or system as claimed in claim 14, configured to respond to a further crash or failure in said second memory before completion of said dumping of said content of said first memory to said dump storage device by dumping content of said second memory to said dump storage device or to another dump storage device, rebooting said operating system in said second memory, and dumping or completing said dumping of said content of said first memory to said dump storage device.

20. A device or system as claimed in claim 14, configured to provide accounting data suitable for determining a cost for providing said second memory while said content of said first memory is being saved.

21. A computer readable medium provided with program data that, when executed on a computing device or system having a first memory and a second memory, controls the device or system to:
upon detecting an operating system crash or failure, initialize said second memory initially provided as auxiliary memory to said first memory;
after the initializing, boot an operating system in said second memory;
dump, using said operating system booted in said second memory, content of said first memory to a dump storage device; and
after dumping the content of said first memory, prepare said first memory for use as auxiliary memory to said second memory.

* * * * *